No. 616,640. Patented Dec. 27, 1898.
T. SHIPLEY.
FREEZING TANK FOR ICE MACHINES.
(Application filed Mar. 15, 1897.)
(No Model.) 4 Sheets—Sheet 1.
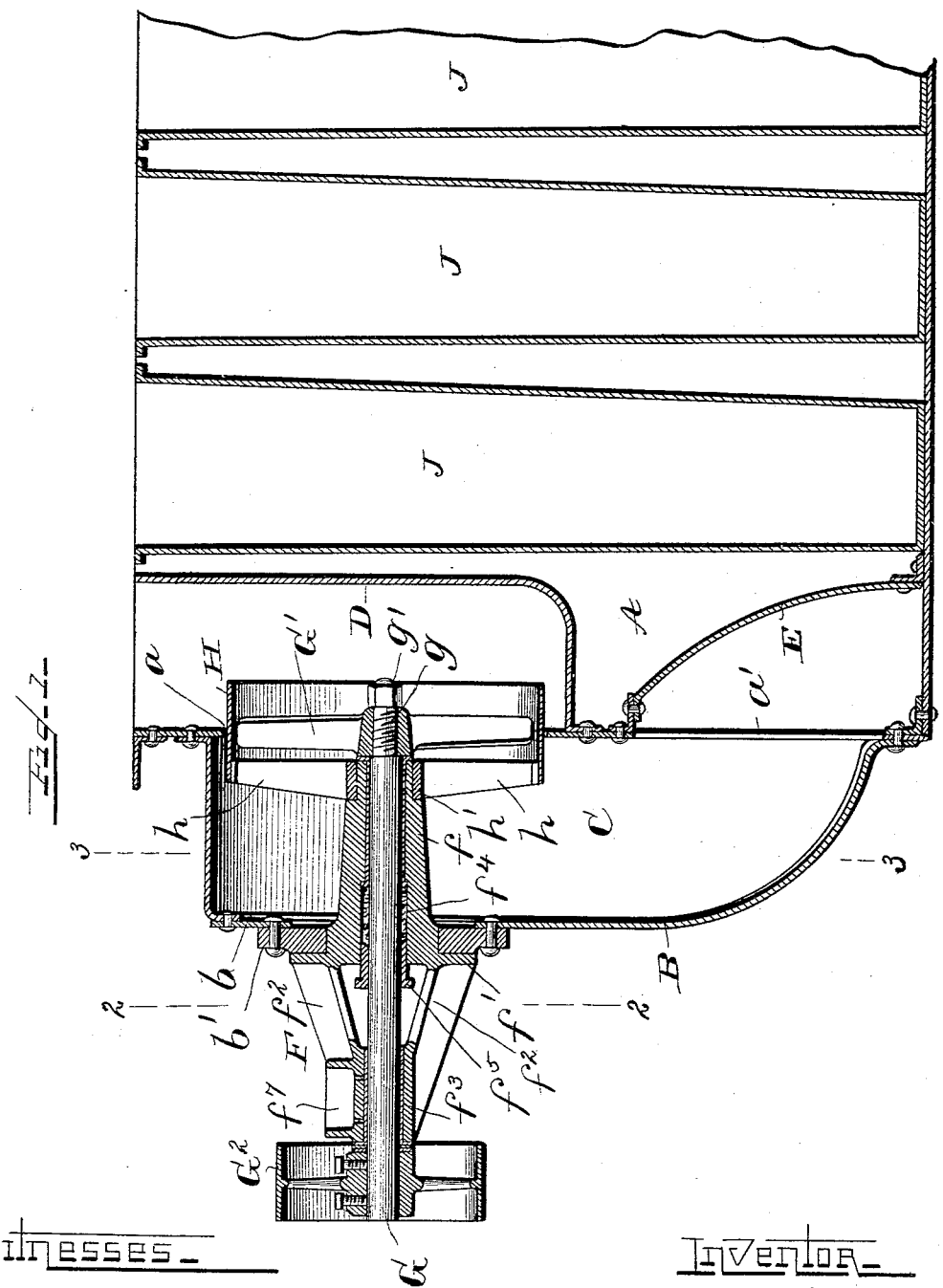

No. 616,640. Patented Dec. 27, 1898.
T. SHIPLEY.
FREEZING TANK FOR ICE MACHINES.
(Application filed Mar. 15, 1897.)
(No Model.) 4 Sheets—Sheet 2.
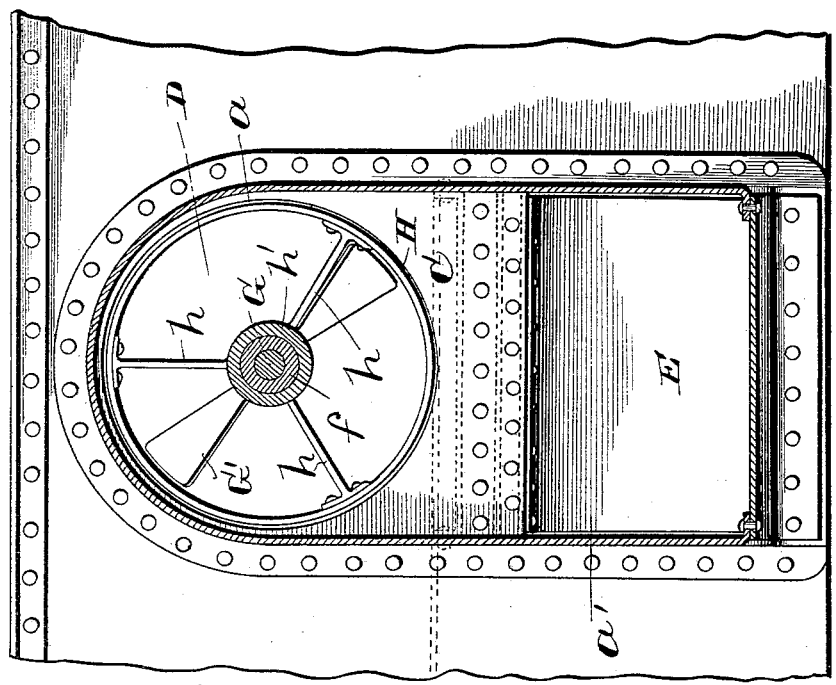
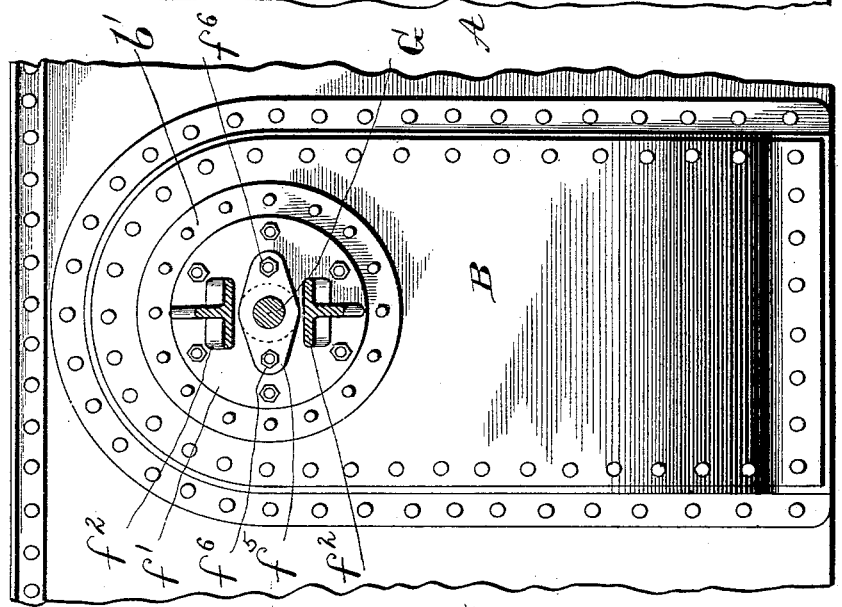
Witnesses
G. A. Rauberschmidt,
J. D. Kingsbury
Inventor
Thomas Shipley
by his Attys.
Whitaker Prevost No. 616,640. Patented Dec. 27, 1898.
T. SHIPLEY.
FREEZING TANK FOR ICE MACHINES.
(Application filed Mar. 15, 1897.)
(No Model.) 4 Sheets—Sheet 3.
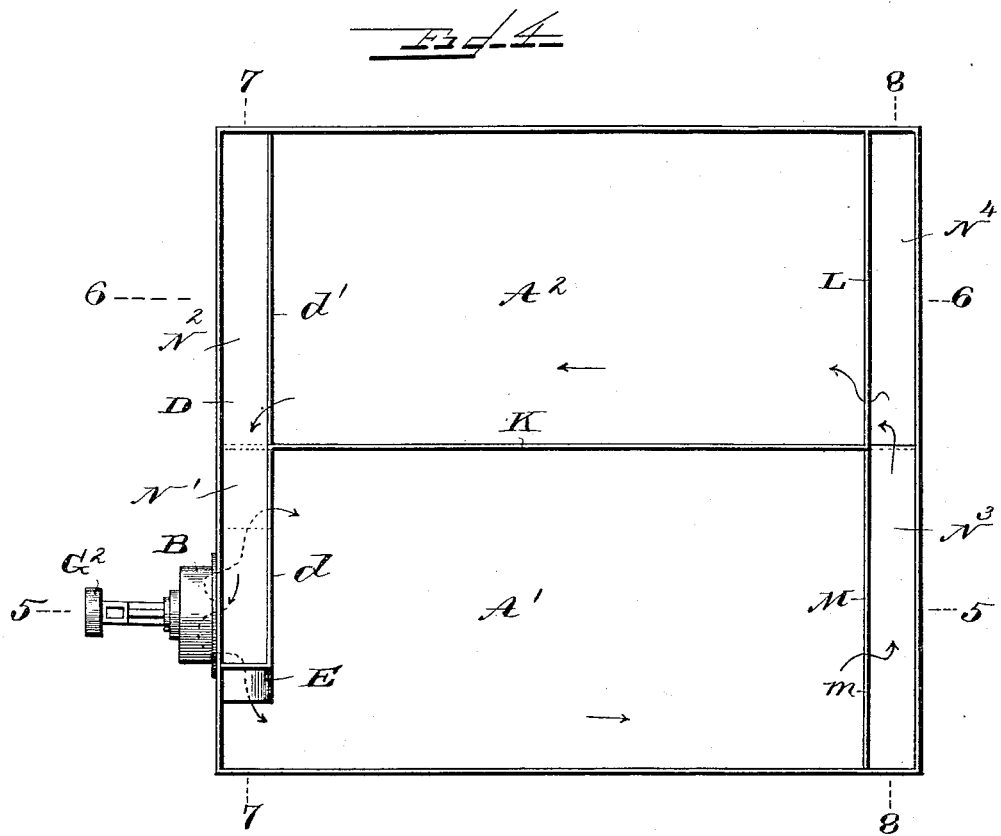
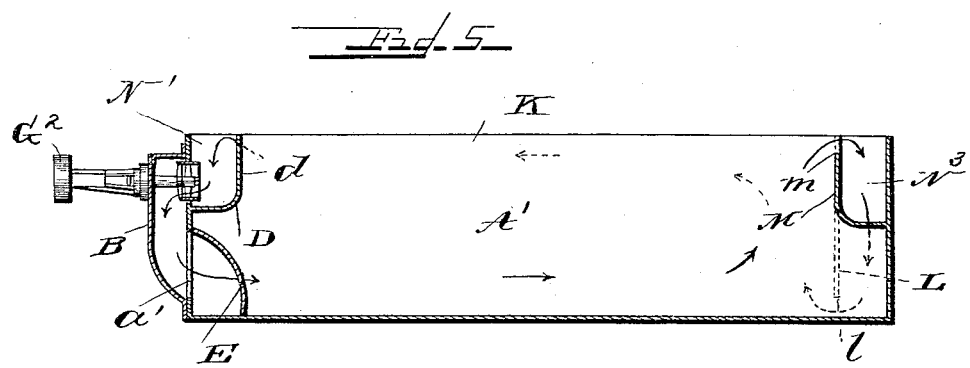

No. 616,640. Patented Dec. 27, 1898.
T. SHIPLEY.
FREEZING TANK FOR ICE MACHINES.
(Application filed Mar. 15, 1897.)
(No Model.) 4 Sheets—Sheet 4.
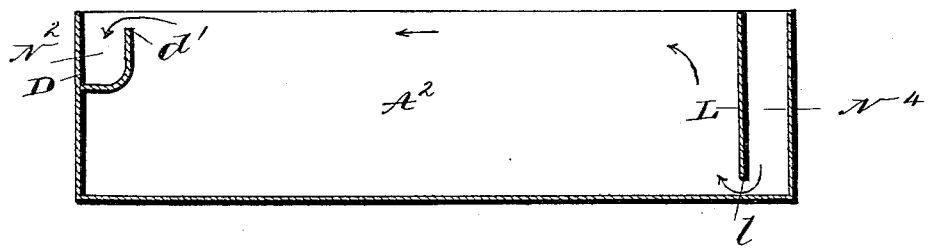
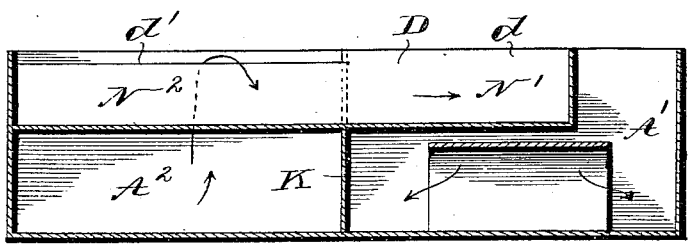
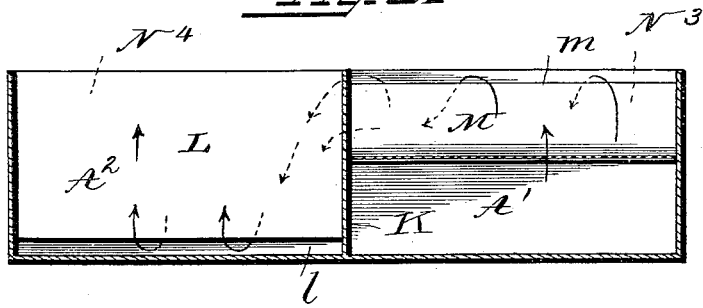
Witnesses
G. A. Rauberschmidt,
J. D. Kingsbury.
Inventor
Thomas Shipley
by his attys.
William Shaw Prevost.

United States Patent Office.

THOMAS SHIPLEY, OF WAYNESBOROUGH, PENNSYLVANIA, ASSIGNOR TO THE FRICK COMPANY, OF SAME PLACE.

FREEZING-TANK FOR ICE-MACHINES.

SPECIFICATION forming part of Letters Patent No. 616,640, dated December 27, 1898.

Application filed March 15, 1897. Serial No. 627,691. (No model.)

*To all whom it may concern:*

Be it known that I, THOMAS SHIPLEY, a citizen of the United States, residing at Waynesborough, in the county of Franklin and State of Pennsylvania, have invented certain new and useful Improvements in Freezing-Tanks for Ice-Machines; and I do hereby declare the following to be a full, clear, and exact description of the invention, such as will enable others skilled in the art to which it appertains to make and use the same.

My invention is an improved brine-tank for ice-machines; and it consists in the novel features hereinafter described, reference being had to the accompanying drawings, which illustrate one form in which I have contemplated embodying my invention, and said invention is fully disclosed in the following description and claims.

Figure 1 represents a longitudinal vertical section through one end of the brine-tank and the agitator. Fig. 2 represents a transverse vertical section on line 2 2 of Fig. 1. Fig. 3 represents a similar section on line 3 3 of Fig. 1. Fig. 4 represents a top plan view of the brine-tank on a reduced scale. Fig. 5 is a vertical sectional view of the tank on the line 5 5, Fig. 4. Fig. 6 is a sectional view on line 6 6, Fig. 4. Fig. 7 is a similar view on line 7 7, Fig. 4. Fig. 8 is a similar view on line 8 8, Fig. 4.

In the drawings, A represents the brine-tank, of usual construction, provided centrally at one end with apertures $a$ and $a'$, located one above the other, the aperture $a$ being located near the top of the tank and being circular in shape.

B represents a shell or casing formed of sheet metal and secured to the end of the tank by rivets or otherwise, covering the apertures $a$ $a'$ and forming a chamber C, communicating with the tank by means of the said apertures. Within the tank A, I arrange a deflector D, adjacent to the aperture $a$, which is preferably constructed in the form of a casing closed at its bottom and sides and open at the top, which is slightly below the top of the tank A. Adjacent to the aperture $a'$ is a deflector E, consisting in this instance of a curved plate, which is placed opposite to said aperture, but provides openings at each side communicating with the interior of the tank.

The chamber C has an aperture $b$ in its outer wall B, which is in line with the aperture $a$ in the end of the tank, and I prefer to reinforce this opening $b$ with a circular ring $b'$, as shown, riveted to the shell B.

F represents the supporting-frame of the agitator, which comprises a sleeve $f$, adapted to pass through aperture $b$ and to extend nearly to the end wall of the tank, said sleeve having a circular flange $f'$, adapted to engage the circular ring $b'$ and to be secured thereto by bolts, as shown in Fig. 2, said flange being provided with arms $f^2$, extending outwardly and carrying on their outer ends the bearing $f^3$, which is preferably formed integrally with the said arms, so that the sleeve $f$, flange $f'$, arms $f^2$, and outer bearing $f^3$ are constructed of a single casting. The bearing $f^3$ is provided with a bushing of Babbitt metal or other suitable material, and the sleeve $f$ is also provided for a portion of its length nearest its inner end with a similar bushing to receive the shaft G of the agitator. The outer end of the sleeve $f$ is bored out at $f^4$ to form a stuffing-box, which is provided with suitable packing and a movable gland $f^5$, adapted to be forced inward by suitable bolts $f^6$ $f^6$ to form a water-tight joint. The joint formed between the flange $f'$ and ring $b'$ will also be packed, if desired, to form a tight joint.

The shaft G is provided on its inner end with a propeller G', having any desired number of blades, located, preferably, in the opening $a$ of the tank, and surrounding said propeller and fitting the opening $a$ is a cylindrical casing H, which is provided with radial arms $h$, connected to a central collar $h'$, which is secured upon the inner end of the sleeve $f$.

The propeller is preferably screwed on the end of the shaft G, which is threaded for the purpose, and secured by a lock-nut $g'$, so that it can be removed. The outer end of the shaft G is provided with any suitable driving means—in this instance a belt-pulley $G^2$, detachably secured thereto by set-screws.

I prefer to provide the outer bearing $f^3$ with an oil-holding cup or recess $f^7$, communicating by suitable apertures with the shaft-bearing within the same, the said oil-cup being formed integral with the bearing, as shown in the drawings.

J J represent the ice-cans, of any desired form, which are submerged in the brine-tank A. The amount of brine in the tank will normally not extend as high as the bottom of the aperture in circular ring $b'$; but the insertion of the ice-cans will cause the level of the brine to rise until it is above the edge $d'$ of deflector D, (see Figs. 6 and 7,) so that the brine will completely fill the shell B.

In order to secure the desired circulation of the brine in the tank, I prefer to construct it in the form shown in Figs. 4, 5, 6, and 7.

K represents a central bulkhead or partition which extends through the tank from one end to the other and divides it into two compartments $A'$ and $A^2$, the propeller being preferably located about centrally of one end of one of said compartments—in this instance compartment $A'$. The deflector D extends from a point in compartment $A'$ adjacent to the agitator to the bulkhead K and entirely across the other compartment $A^2$, as shown, thus forming chambers $N'$ and $N^2$, one in each compartment. The top edge of the portion of the deflector in compartment $A'$ is on a level with the top of bulkhead K and the walls of the tank, while the top edge $d'$ of the portion in compartment $A^2$ is somewhat below the top of the bulkhead K, as shown in the drawings. The bulkhead K is cut away within the deflector D, forming a communication between the two chambers $N'$ and $N^2$. At the other end of the brine-tank the compartment $A^2$ is provided with a transverse bulkhead L, parallel and adjacent to the end of the tank, forming a separate chamber, said bulkhead extending from a plane slightly above the bottom of the tank to a plane level with the top of bulkhead K, leaving an opening $l$, which establishes a communication between the main part of compartment $A^2$ and the chamber $N^4$ within the bulkhead.

In compartment $A'$ a deflector M is provided, extending the entire width of the compartment in this instance, having a vertical wall in line with the bulkhead L and having a horizontal wall which extends over to the end of the tank, forming a chamber $N^3$. The top edge $m$ of this deflector is below level with the top of bulkhead K, and the bulkhead K is cut away adjacent to the inner end of deflector M, as shown in Figs. 5 and 8.

The course of the brine is as follows: The brine forced into the bottom of the compartment $A'$ by the agitator through the aperture $a'$ enters on each side of deflector E and passes to the other end of said compartment, where it flows over the edge $m$ of deflector M, then over the reduced portion $k'$ of the bulkhead K, down behind bulkhead L, beneath said bulkhead, through the aperture, and across to the other end of the compartment $A'$, where it flows over the top edge $d'$ of deflector D, thence over the reduced portion $k'$ of bulkhead K, and thence to the agitator. It will thus be seen that in each compartment the brine is forced in at the bottom at one end and leaves at the top at the other end, thus producing a very desirable circulation and distribution of the brine.

In very large tanks I may provide a multiplication of the arrangement of bulkheads and partitions and employ several agitators, if desired, without departing from the spirit of my invention.

In case of any accident to the propeller access can be had to it for repairs by removing a number of ice-cans J sufficient to lower the brine-level below the propeller-shaft, as will be readily understood, when the propeller can be instantly removed and another replaced, or it can be repaired and replaced. If it becomes necessary to remove the shaft, it can be drawn out without spilling the brine by loosening the stuffing-box, or by removing the cylindrical casing H from the sleeve $f$ and loosening the bolts connecting flange $f'$ to the ring $b'$ the whole device can be removed if found necessary. As soon as the agitating device is repaired the ice-cans will be replaced, thus raising the brine-level and the operation can be resumed.

What I claim, and desire to secure by Letters Patent, is—

1. The combination with the freezing-tank having a part connected with one of its side walls provided with an aperture above the normal brine-level and below the level to which the brine is raised by the insertion of the freezing-cans, a removable agitator-shaft extending horizontally through said aperture, an agitator detachably secured to said shaft, and the removable freezing-tanks, whereby the said cans may be removed to lower the brine-level below said aperture to permit the removal of the agitator and agitator-shaft without drawing off the brine, substantially as described.

2. The combination with the freezing-tank provided with an outlet-aperture above the normal brine-level and an inlet-aperture below said outlet-aperture, of a casing secured to the wall of said tank and covering said apertures, said casing being provided with an aperture above the normal brine-level and below the level to which the brine is raised by the insertion of the freezing-cans, a removable agitator-shaft extending horizontally through said aperture, an agitator on the inner end of said shaft and detachably secured thereto, and the removable freezing-cans, whereby said cans may be removed to lower the brine-level below said aperture to permit the removal of the agitator and agitator-shaft, without drawing off the brine, substantially as described.

3. The combination with the freezing-tank provided with an outlet in one end above the normal brine-level and an inlet below said outlet, of a casing secured to the exterior of said tank covering said outlet and inlet, a propeller in said casing, adjacent to said outlet and above the normal brine-level and a shield within the tank covering said outlet having a wall extending to a point near the top of the tank and adapted to receive the warmer portions of the brine and conduct them to the casing, and the freezing-cans adapted to be immersed in said tank, substantially as described.

4. The combination with the brine-tank provided at one side with an outlet-aperture and an inlet-aperture below said outlet, of a casing secured to said tank covering said apertures and provided with an aperture in line with said outlet, a sleeve extending through said aperture in said casing provided with a flange secured to said casing adjacent to said aperture, said sleeve being provided with a shaft-bearing at its inner end and a stuffing-box adjacent to said flange, a propeller-shaft extending through said sleeve to a point within said outlet-aperture, a cylindrical casing in said outlet-aperture provided with supporting-arms engaging said sleeve and a propeller detachably secured to said shaft within said cylindrical casing, substantially as described.

5. The combination with the freezing-tank provided with an outlet-aperture above the normal brine-level, an outlet-aperture below said outlet and deflectors within said tank, opposite said apertures, of a casing secured to the exterior of said tank covering said apertures and provided with an aperture in line with said outlet-aperture, a sleeve engaging said casing-aperture provided with a flange detachably secured to said casing, said flange having outwardly-extending arms supporting a bearing in line with said sleeve, a propeller-shaft extending through said bearing and sleeve, a stuffing-box for said sleeve, surrounding said shaft, a cylindrical casing within said outlet-aperture detachably secured to and supported by said sleeve, a propeller detachably secured to said shaft within said cylindrical casing and the freezing-tanks adapted to be immersed in the brine in said tank to raise the brine-level above said propeller, whereby the removal of a number of said cans will lower the brine-level and expose the propeller, substantially as described.

6. The combination with a brine-tank provided with a longitudinal partition forming a compartment on each side of the same, chambers provided at opposite ends of each compartment communicating with the main portion of said compartment at one end at a point adjacent to the bottom and at the other end at a point adjacent to the top, the chambers of each compartment communicating respectively with the chambers of the other, and a brine-agitating device communicating with one of said chambers, and having an independent communication with the compartment for said chamber, substantially as described.

7. The combination with a brine-tank provided with a longitudinal bulkhead dividing said tank into two compartments, one of said compartments having at one end a bulkhead extending from a point above the bottom of the tank to the top of the same, and at the other a deflector having its edge below the level of the top of said bulkhead and extending into the second compartment, and having the upper edge of the portion within said second compartment extending to the top of the tank, an agitator communicating with the chamber formed within said deflector in said second compartment, said agitator having a communication with said compartment below the said deflector, and a deflector at the opposite end of said second compartment having its upper edge below the level of the top of said tank, and a communication between said compartments adjacent to the top of the tank through the central partition at opposite ends of the tank, within said deflectors, substantially as described.

In testimony whereof I affix my signature in presence of two witnesses.

THOMAS SHIPLEY.

Witnesses:
A. B. STRICKLER,
W. H. MANUS.